US010710163B2

(12) United States Patent
Silveira E Silva et al.

(10) Patent No.: US 10,710,163 B2
(45) Date of Patent: Jul. 14, 2020

(54) AUTOMATIC SYSTEM AND METHOD FOR MEASURING AND MACHINING THE END OF TUBULAR ELEMENTS

(71) Applicant: VALLOUREC TUBOS DO BRASIL, S.A., Belo Horizonte (FR)

(72) Inventors: Julio Marcio Silveira E Silva, Belo Horizonte (BR); Marcelo Jardim De Souza, Belo Horizonte (BR); Felipe Leal Carvalho, Belo Horizonte (BR); Gustavo Alves Pinheiro, Belo Horizonte (BR); Andre Ricardo De Souza E Sa, Belo Horizonte (BR)

(73) Assignee: VALLOUREC TUBOS DO BRASIL, S.A., Belo Horizonte (BR)

( * ) Notice: Subject to any disclaimer, the term of this patent is extended or adjusted under 35 U.S.C. 154(b) by 98 days.

(21) Appl. No.: 15/760,982

(22) PCT Filed: Sep. 16, 2016

(86) PCT No.: PCT/BR2016/050228
§ 371 (c)(1),
(2) Date: Mar. 16, 2018

(87) PCT Pub. No.: WO2017/045051
PCT Pub. Date: Mar. 23, 2017

(65) Prior Publication Data
US 2018/0264556 A1 Sep. 20, 2018

(30) Foreign Application Priority Data
Sep. 17, 2015 (BR) .............................. 102015024034

(51) Int. Cl.
*B23B 5/08* (2006.01)
*B23Q 17/24* (2006.01)
(Continued)

(52) U.S. Cl.
CPC ................ *B23B 5/08* (2013.01); *B23Q 17/24* (2013.01); *G01B 11/08* (2013.01); *G01B 11/12* (2013.01);
(Continued)

(58) Field of Classification Search
CPC ...... G01B 11/08; G01B 11/12; G01N 21/954; G01N 21/952; B23Q 17/24;
(Continued)

(56) References Cited

U.S. PATENT DOCUMENTS 3,817,647 A * 6/1974 Lemelson ............. B23B 49/001
408/8
3,840,994 A * 10/1974 Izumi ....................... G01B 5/08
33/504
(Continued)

FOREIGN PATENT DOCUMENTS

CN          102650516         10/2014
DE          3618856 A1  *   12/1987  ............... G01B 5/01
(Continued)

OTHER PUBLICATIONS

International Search Report issued by the European Patent Office for International Patent Application No. PCT/BR2016/050228, dated Jan. 3, 2017, 5 pages.
(Continued)

*Primary Examiner* — Sara Addisu
(74) *Attorney, Agent, or Firm* — Sheridan Ross P.C.

(57) ABSTRACT

The present invention relates to an automatic system for measuring and machining pipe ends having measuring equipment that has an internal laser sensor and an external laser sensor. The system can also have a machining station that has at least one machining tool for machining the inner diameter of the pipe and at least one machining tool for machining the outer diameter of the pipe, which are cen-
(Continued)

tralized and operated independently of each other. In some embodiments, the system has an electronic interface central between the measuring equipment and the machining tools, having records of critical values of outer diameter and inner diameter for the pipe end, the electronic interface central receiving measured values of outer and inner diameters from the measuring equipment, comparing them with the critical values, and controlling the operation of the machining tools as a function of the result of the comparison.

21 Claims, 6 Drawing Sheets (51) Int. Cl.
G01B 11/12 (2006.01)
G01N 21/952 (2006.01)
G01N 21/954 (2006.01)
G01B 11/08 (2006.01)
B23Q 17/20 (2006.01)

(52) U.S. Cl.
CPC ......... *G01N 21/952* (2013.01); *G01N 21/954* (2013.01); *B23Q 17/20* (2013.01); *B23Q 17/2471* (2013.01)

(58) Field of Classification Search
CPC .... B23Q 17/2471; B23Q 15/02; B23Q 15/06; B23Q 17/20; B23B 5/08
See application file for complete search history.

(56) References Cited

U.S. PATENT DOCUMENTS

| | | | | |
|---|---|---|---|---|
| 4,524,523 A * | 6/1985 | Golinelli | ............... | G01B 3/002 33/501.5 |
| 4,576,069 A * | 3/1986 | Bazuin | ............... | B23Q 11/08 408/2 |
| 4,774,753 A * | 10/1988 | Holy | ............... | B23Q 17/20 33/504 |
| 5,267,381 A * | 12/1993 | Wright | ............... | B23B 5/14 29/33 T |
| 5,778,744 A | 7/1998 | Braun et al. | | |
| 6,209,429 B1 * | 4/2001 | Urso, III | ............... | B23B 1/00 82/1.11 |
| 6,272,762 B1 * | 8/2001 | Kinast | ............... | G01B 5/201 33/504 |
| 6,289,600 B1 | 9/2001 | Watts | | |
| 6,568,096 B1 * | 5/2003 | Svitkin | ............... | B23Q 1/76 33/501.02 |
| 6,708,382 B2 * | 3/2004 | Yamazaki | ............... | B23B 27/1662 29/27 C |
| 6,884,204 B2 * | 4/2005 | Watanabe | ............... | B23Q 3/183 409/133 |
| 7,674,079 B2 * | 3/2010 | Schawe | ............... | B23G 1/02 29/33 T |
| 8,434,392 B1 * | 5/2013 | Lerner | ............... | G01B 21/14 318/572 |
| 8,881,354 B2 * | 11/2014 | Nakamura | ............... | B23B 29/03421 29/26 R |
| 8,974,357 B2 * | 3/2015 | Kitayama | ............... | B23B 3/10 483/17 |
| 9,057,601 B2 * | 6/2015 | Topueth | ............... | G01B 11/2408 |
| 9,372,076 B2 * | 6/2016 | Tripp | ............... | G01B 11/24 |
| 9,410,795 B2 * | 8/2016 | Baba | ............... | G01B 11/24 |
| 9,897,428 B2 * | 2/2018 | Hieb | ............... | G01B 5/10 |
| 2004/0074350 A1 * | 4/2004 | Hanada | ............... | B24B 9/007 82/1.11 |
| 2009/0133239 A1 * | 5/2009 | Tanaka | ............... | B23B 25/06 29/48.5 R |
| 2009/0133545 A1 * | 5/2009 | Tanaka | ............... | B23Q 17/20 82/121 |
| 2010/0162861 A1 * | 7/2010 | Bartz | ............... | B23B 5/12 82/130 |
| 2011/0023667 A1 * | 2/2011 | Kume | ............... | B23B 41/04 82/1.3 |
| 2011/0283847 A1 * | 11/2011 | Schreiber | ............... | B23B 25/06 82/152 |
| 2014/0150509 A1 * | 6/2014 | Wisler | ............... | B29D 23/001 72/17.3 |
| 2014/0168414 A1 * | 6/2014 | Brumovsky | ............... | H04N 7/18 348/92 |
| 2014/0360036 A1 | 12/2014 | Moreau et al. | | |
| 2015/0131109 A1 * | 5/2015 | Baba | ............... | G01B 11/12 356/635 |
| 2015/0377288 A1 * | 12/2015 | Carrerot | ............... | B23B 5/08 384/567 |
| 2017/0136548 A1 * | 5/2017 | Ochiai | ............... | B23Q 15/02 |
| 2019/0233208 A1 * | 8/2019 | Nikolich | ............... | B65G 1/04 |

FOREIGN PATENT DOCUMENTS

| | | | | |
|---|---|---|---|---|
| DE | 102012018417 A1 * | 3/2014 | ............ | G01H 13/00 |
| EP | 2905576 | 8/2015 | | |
| JP | 60197301 A * | 10/1985 | ............ | B23Q 17/20 |
| JP | S62-228302 | 10/1987 | | |

OTHER PUBLICATIONS

Written Opinion issued by the European Patent Office for International Patent Application No. PCT/BR2016/050228, dated Jan. 3, 2017, 5 pages.

* cited by examiner

AUTOMATIC SYSTEM AND METHOD FOR MEASURING AND MACHINING THE END OF TUBULAR ELEMENTS

CROSS REFERENCE TO RELATED APPLICATIONS

This application is a national stage application under 35 U.S.C. 371 and claims the benefit of PCT Application No. PCT/BR2016/050228 having an international filing date of Sep. 16, 2016, which designated the United States, which PCT application claimed the benefit of Brazilian Patent Application No. BR 10 2015 024034 1, filed Sep. 17, 2015, both of which are incorporated herein by reference.

The present invention relates to an automatized system and method for measuring and machining tub ends with a high degree of precision and productivity, which can be used both in and out of production line. The measuring method can be used for pipes of different technical applications, among which is the oil and gas industry.

DESCRIPTION OF THE PRIOR ART

Nowadays, with the offshore environment having more and more severe conditions, petroleum companies and their partners need to face great challenges in order to guarantee quality, safety and productivity in exploiting and transporting petroleum. In this scenario, risers connecting the oil well and the platform, and flow lines between an oil well and another, play an important role in the transport of oil and gas.

Figure 13:
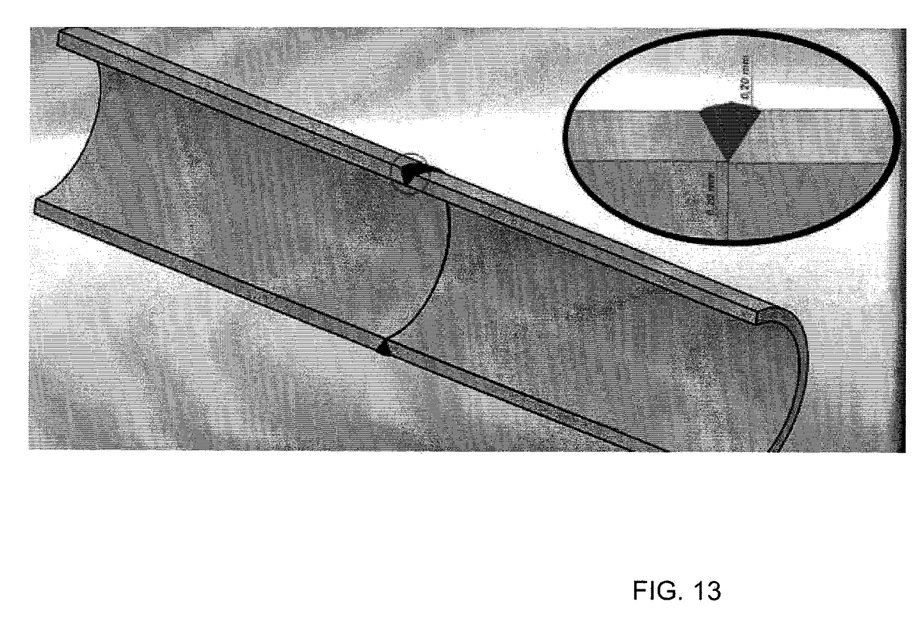
FIG. 13 a cross-sectional view of a soldering joint of two pipes showing the differences between the diameters of the pipe ends (Hi-lo).

Besides the different compositions of steel with specially developed alloys and with special processing routes for resulting in greater resistance to fracture induced by hydrogen (HIC), to fracture induced by sulfide (SSC) and improved mechanical properties, the size tolerances may be important parameters in the mechanics of fracture and that should be carefully inspected, chiefly when it comes to solder joining between pipes for conduction and exploitation of petroleum. In this regard, narrower tolerances at the tube ends are required, since the difference between the wall thicknesses (Hi-Lo) between the tube ends soldered in the soldering region, as shown in FIG. 13", may have harmful effects, as for example decrease in fatigue strength, problems with indications/rejections in non-destructive tests, as well as loss of productivity in the production of petroleum. For the production of oil pipes, specifically pipelines, the wall-thickness tolerances at ends, specified in technical regulations, in most cases are not sufficient to guarantee good matching between the soldered pipes. So, in order to prevent problems like those listed before, petroleum companies usually ask to mat the wall at the ends of each pipeline and to identify the best matching between the supplied pipes, so that the effects caused at the moment of soldering by great differences in wall can be reduced. The side effects for such mapping are related to a greater logistics complexity due to the need to selection of pipes, lower productivity at the facilities and offshore pipe-layers and negative effects on fatigue strength in dynamic applications.

The term "Hi-Lo" is used to indicate the differences and variations in diameter and thickness at the end of the soldered pipes, resulting in steps at the joint between two pipes. The correct sizing of the "Hi-Lo" in the designs minimizes the differences in wall thickness for the subsequent soldering process. However, without automation of the measuring system coupled to a 3-axle mechanical lathe, the process of measuring and mapping the pipes manually becomes expensive and, in general, exhibits low productivity.

Document CN102650516 relates to an on-line measuring method for measuring the outer diameter and ovality of the end of the large-diameter steel pipe having the following steps: obtaining the nominal data of a to-be-measured steel pipe for determining the axis position, setting the interval for an outer diameter laser displacement sensor, enabling a probe of the sensor to be directed at the axis for measurement and then obtaining the diameter D of the to-be-measured steel pipe, rotating the sensor for 180 degrees for measuring the outer diameter in the all peripheral direction, and obtaining the average diameter and ovality of the to-be-measured steel pipe. The on-line measuring device for the outer diameter and the ovality of large-diameter steel pipe end is characterized by including an industrial robot, an outer diameter measuring device and an axis detecting device. The standard industrial robot is adopted for carrying the measuring device and arranged around the to-be-measured steel pipe end. Document CN102650516 does not suggest the processing of measured values and subsequent machining of the pipe end.

Document U.S. Pat. No. 5,778,744 describes a method for machining a chamfer on a seamless pipe, which uses sensors to identify the inner and outer diameter of the pipe end, so as to eliminate imprecisions due to the deviations of a perfect cylindrical profile that are often present on seamless pipes. The method also takes into account a theoretical profile of the pipe end and the real dimensions of the inner and outer diameters of the pipe, and carries out the machining in two steps, the first one being a rough-machining step, and the second one being a finish-machining step. However, this document does not suggest the use of laser sensors and is limited to machining an end chamfer, and does not suggest carrying out a complete machining of the pipe end to adjust wall thickness and the outer and inner diameters.

Document JPS62228302 describes a method for machining the external surface of a pipe without causing unbalanced wall-thickness over the entire length thereof by making trailing rollers in rolling contact with the external surface of the tube, and the position of a cutting tool follow a tube bend after initial machining on the basis of data of wall thickness distribution and runout before the tube machining. This method uses sensors to help in machining only the external wall of the tube, so as to eliminate unbalancing. However, this document does not suggest carrying out the machining inside the tube as well and independently of the external machining.

OBJECTIVES OF THE INVENTION

A first objective of this invention is to propose a method and automated measuring system, integrated with a machining process for aligning the pipe ends, following the narrowest tube-end tolerances, maximizing the average and minimum wall thickness after machining, and compensating eccentricities, so as to guarantee lower values of difference between maximum and minimum limits specified by technical rules and/or clients.

A second objective of this invention is to integrate a measuring system and a CNC lathe through dedicated software responsible for handling the measured values, calculating the machining coordinates so that the pipe ends can be machined with restricted tolerances.

It is also an objective of the invention to provide a method and a system for aligning pipe ends, which can be used for different types of pipes, such as risers, flowlines, transport ducts, among others, with competitive cost/benefit Another objective of the invention is to provide a method and a system for aligning pipe ends, capable of measuring the inner and the outer diameters of the pipe end independently, with subsequent machining by using a CNC lathe with centralized tolls, also independently for the inner and outer diameters.

BRIEF DESCRIPTION OF THE INVENTION

The objectives of the invention are achieved by means of an automated system for measuring and machining ends of tubular elements, comprising measuring equipment that has an internal laser sensor to measure the inner diameter of the pipe end on at least one pipe length; an external laser sensor to measure the outer diameter of the pipe end on at least one pipe length; a machining station that has: at least one machining tool for machining the inner diameter of the pipe and at least one machining tool for machining the outer diameter of the tube, the machining tools being operated independently of each other; an electronic central for interface between the measuring equipment and the machining tools, which contains records of critical values of outer diameter and inner diameter for the pipe end, the electronic interface central receiving the measured values of outer and inner diameters from the measuring equipment comparing the critical values of outer and inner diameter, and controlling the machining tools for machining the inner and outer diameters as a function of the result of the comparison, so that the real values of outer and inner diameters of the pipe will came close to the critical values of outer and inner diameters.

Preferably, the measuring equipment further has a positioning laser sensor to measure the positioning to the machining tools, and an automated arm that has, at one end, a fork with a plurality of teeth, each laser sensor being arranged on a fork tooth. Preferably, the machining station has at least one machining tool for machining the inner diameter of the pipe and too machining tools for machining the outer diameter of the pipe, each tool being operated independently. The electronic interface central has a computer-aided numeric control that controls the operation of the machining station to reduce the pipe eccentricity. The electronic interface central preferably stores values of outer and inner diameters of the tube measured before and after the machining.

The electronic interface central preferably has a measurement analysis unit that calculates the wall thickness of the pipe by the difference between the measured values of outer and inner diameters in each position of the pipe circumference, and compares the calculated values of wall thickness with the critical values of wall thickness. The electronic interface central determines the minimum and maximum values of the outer and inner diameters, of the eccentricity and of the wall thickness of the pipe end on the basis of the measured values of outer and inner diameters of the pipe. The electronic interface central preferably calculates the critical values of outer and inner diameter for the pip end by means of a previous measurement of samples of tubular elements and of a statistic analysis of the variability of the measured maximum and minimum diameters of the samples.

The objectives of the invention are further achieved by means of an automatic method for measuring and machining the ends of tubular elements, which comprises: measuring the inner diameter of the pipe end on at least one pipe length; measuring the outer diameter of the pipe end on at least one pipe length; processing the measured values of outer and inner diameters and comparing them with critical values of outer and inner diameters, and machining, in a controlled manner, the inner diameter and the outer diameter of the pipe end as a function of the result of the comparison, so that the real values of the outer and inner diameters of the pipe will come close to the critical values of outer and inner diameters, to reduce the pipe eccentricity, The steps of measuring the inner diameter and the outer diameter of the pipe end are carried out preferably independently from each other, and they may be carried out on three pipe lengths.

After the machining step, one may carry out a new step of measuring the inner and outer diameters of the pipe end on at least one pipe length, and a step of recording the final measured values of the inner and outer diameters of the pipe end after machining.

The control of the step of machining the inner and outer diameters of the pipe is carried out by means of a computer-aided numeric control. The controlled machining of the inner and outer diameters of the pipe end may comprise machining the inner diameter with dimensions that decrease progressively toward the pipe center in a pipe length, and machining the outer diameter with dimensions that increase progressively toward the pipe center in the pipe length, forming a transition region with larger wall thickness between the pipe end and the rest of the pipe length.

The step of processing the measured values of outer and inner diameters comprises preferably: determining the minimum and maximum values of the outer and inner values of the pipe end and of the wall thickness of the pipe end on the basis of the measured values of outer and inner diameters of the pipe. The step of determining the wall thickness of the pipe comprises calculating the difference between the measured values of outer and inner diameters in each position of the pipe circumference on the measured length, comparing the calculated values of wall thickness with the critical values of wall thickness and identifying the coordinates of the machining positions on the inner and on the outer diameters of the pipe.

The method preferably comprises an initial step of calculating the critical values of outer and inner diameters for the pipe end on the basis of a previous measurement of samples of tubular elements and statistical analysis of the variability of measured maximum and minimum diameters of the samples. The method preferably comprises, prior to the machining step, a step of discarding the pipe, if the measured values of inner and outer diameters are insufficient to achieve the critical values of inner and outer diameters after machining.

BRIEF DESCRIPTION OF THE DRAWING

The present invention will now be described in greater detail with reference to an example of embodiment represented in the drawings. The figures show.

DETAILED DESCRIPTION OF THE FIGURES

Figure 1:
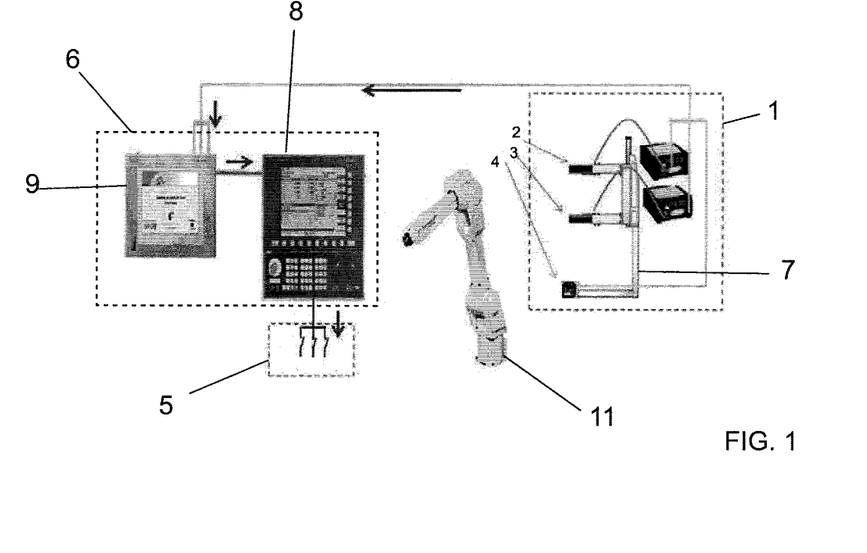
FIG. 1 is a schematic view of an automatic system for measuring and machining ends of tubular elements according to the invention.

FIG. 1 shows schematically a preferred embodiment of the composition of equipment, hardware and software of the system for automatic measuring and machining of the end of tubular elements according to the invention. The tubular elements are generally steel pipes 10 used in the oil and gas industry, but the system according to the invention can also be applied to tubular elements of other natures and other materials, when there is a need to measure and/or machine the ends thereof.

The system has measuring equipment 1 that can be actuated to measure the diameters (OD/ID), ovality and eccentricity of the pipe before and/or after machining, at different positions/planes along a maximum length of 500 mm from the ends of tubular elements, the measurement being made in the same positions before and after machining, for the purpose of adjusting and verifying the result. The measuring equipment 1 is provided with a internal laser sensor 3 to measure the inner diameter of the pipe end, and an external laser sensor 2 to measure the outer diameter of the pipe end, both on at least one section of the length of the pipe end. Preferably, the measuring equipment 1 further has a positioning laser sensor 4, which measures the positioning of the machining tools with respect to the center of the respective machining tool or machining station.

In an embodiment of the invention, the measuring equipment is constituted by a robot 11 that makes all the movements necessary to carry the laser sensors as far as the pipe ends and rotating the sensors so that the measurements will be made every degree. This robot has an automated arm 7, which moves the laser sensors 2, 3, 4 around and along the periphery of the pipe end. At the end of the automated arm 7 a fork is coupled, on whose teeth the laser sensors 2, 3, 4 are mounted. In this embodiment of the invention, which employs three sensors, the fork has three teeth. On the lower tooth, one arranges the positioning laser sensor 4. On the central one, the external laser sensor 2 is coupled, and on the upper tooth the internal laser sensor 3 is coupled. The outer 2 and internal sensors are positions respectively out of the pipe and within the pipe, and are moved around and along the length of the pipe end.

The automated arm 7 displaces the sensors 2, 3 in the axial direction of the pipe, so that they can measure the inner and outer diameters of the pipe in various axial positions close to the pipe end.

In the embodiment of the invention shown in FIG. 1, the sensors 2, 3 and 4 are triangulation laser sensors. The external sensor 2 and the internal sensor make measurements at the 360 degrees of the pipe circumference, making a measurement every degree of the pipe circumference. Usually, up to three measurements are made at axially different section of the pipe end 10, and preferably in any position as far as about 300 mm from the edge of the pipe end, or more than 300 mm, depending of the technical specification and of the configuration of the measuring equipment. The combination of the laser sensors with the automated arm contributes for the system to make quite precise measurements of the surface of the pipe end.

The automatic system for measuring and machining the end of tubular elements according to the invention has also a machining station 5 that is responsible for machining and sizing the pipe end, so that the real values achieved after machining the outer and inner diameters, ovality, eccentricity and wall thickness of the pipe can come close to the values specified by clients and/or technical rules with minimum variation possible, or calculated by the system (herein called critical values). The system seeks to maximize the wall thickness and reduce pipe eccentricity, in order to achieve the best tolerance values of pipe end that will provide better matching between the soldered pipes.

Figure 2:
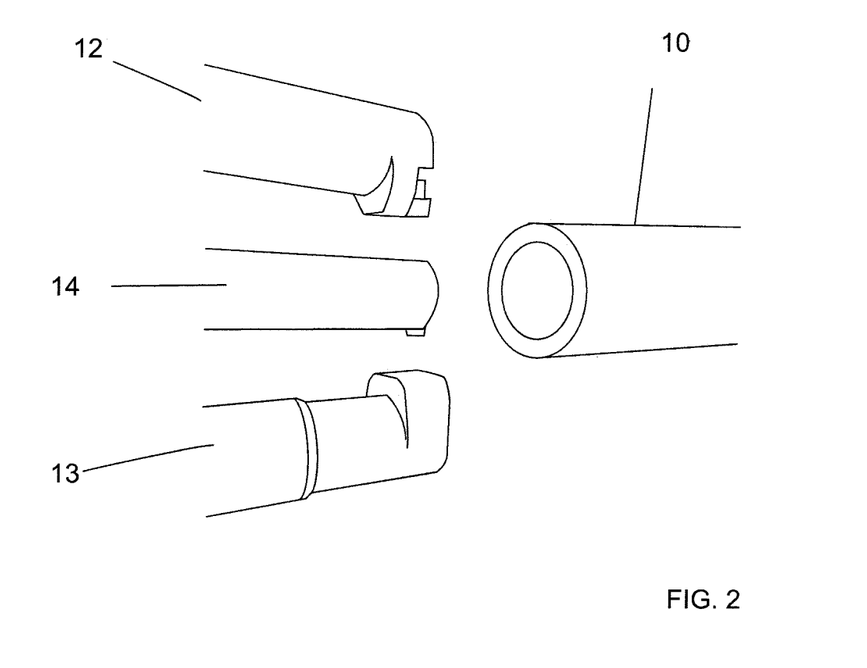
FIG. 2 is a perspective partial view of the machining tool of the system according to the invention.

For this purpose, the machining station 5 comprises at least one and preferably two machining tools for machining the inner diameter of the pipe 14 and at least one and preferably two machining tools for machining the outer diameter of the pipe 12, 13, integrating a machining tool, as shown in FIG. 2. The machining tools 12, 13 and 14 are coupled to the same central axle of the machining station 5. The machining tools operate and machine the pipe independently from each other.

An electronic interface central 6 of the system according to the invention is responsible for carrying out the interface between the measuring equipment 1 and the machining station 5. At this electronic interface central 6, the critical values of outer and inner diameters for the pipe end are recorded. These critical values are determined as a function of technical rules and/or rules from the client, on the basis of the dimension tolerance limits necessary or desired for application of those pipes, and are previously programmed at this interface central 6.

The electronic interface central 6 receives the values of outer and inner diameter measured by the measuring equipment 1 before and/after machining, and can keep records of these values for all the production pipes. The electronic interface central 6 compares the measured values of outer and inner diameters with the critical values of outer and inner diameters recorded before, and controls the operation of the machining tools 12, 13, and 14 as a function of the result of the comparison, so that the pipes 10 can be machined up to the critical values of the outer and inner diameters calculated or recorded previously. These values are calculated by the interface central 6, usually by means of software. The system also seeks to carry out control of the operation of the machining tools 12, 13, and 14 to reduce pipe eccentricity, that is, so that the circumferences corresponding to the inner and outer diameters will be eccentric.

The electronic interface central 6 has a measurement analysis unit 9, shown in FIG. 1, to analyze and process the measured values, and also to control the operation of the measuring equipment 1, of the automatic arm 7 and of the robot, as the case may be. On the basis of the values measured by the sensors, the measurement analysis unit 9 calculates the real minimum and maximum values of the outer and inner diameters, of the eccentricity and of the wall thickness of the real pipe end. The wall thickness of the pipe is calculated by the difference between the measures values of outer and inner values at each position of the pipe circumference Before the machining, the measurement analysis unit 9 verifies whether that pipe has material and wall thickness sufficient to be machined and sized, so that the specified/desired final shape of the pipe can be achieved. If the pipe does not meet these requirements, it is discarded.

The measurement analysis unit 9 is also responsible for comparing the calculated values of wall thickness and measured values of inner and outer diameters with critical values of wall thickness and of the diameters recorded before, to generate the control signals that will be used to control the operation of the machining tools 12, 13, 14.

In an embodiment of the invention, the critical values are calculated at the measurement analysis unit 9 of the electronic central 6 of the system, with the aid of dedicated software, on the basis of the measurement and from the analysis of the dimensions of a few samples of the lot of pipes to be machined. The dedicated software of the system enables one to carry out the measurement and control of the operation of the machining tools for machining the inner and outer diameters individually and separately, increasing considerably the rate of production of the pipes measured, machined and sized by the system. Besides, the system may be programmed in different ways, which enables application thereof to bosh risers and flowlines for transporting oil and gas with good cost/benefit relationship in all cases.

This dedicated software is configured to find the best combinations of inner and outer diameters of the pipe, so that it can be sized within the threshold values of these variables, and to achieve a better matching between pipes of the same lot. The software also seeks always to achieve maximization of the wall thickness and reduction of the eccentricity, in order to achieve better performance and quality of the pipe.

In an example, about 300 pipes of one lot are previously scanned by the system according to the invention, and their values of outer and inner diameters are measured, their wall thicknesses, eccentricity and ovality are calculated and their maximum inner and outer diameters are identified. At the measurement analysis unit 9 of the electronic central 6, one makes an analysis of the variability of the maximum and minimum diameters identified and then the target values of the inner and outer diameters are defined statistically with the aid of said software. The target values of the inner and outer diameters are calculated, so as to prevent further waste of material as much as possible and to guarantee the tolerance limits of the pipe ends and larger wall thickness of that specific lot of pipes.

As can be seen in FIG. 1, the electronic interface central 6 has a computer-aided numeric control (CNC) 8 responsible for controlling the operation of the machining station 5, and more specifically of the external 12 and 13 and internal 14 machining tools individually. This control CNC 8 receives all the data calculated by the measurement analysis unit 9 of the electronic interface central 6 necessary to control the machining tools 12, 13, 14, taking into account the values of inner and outer diameters calculated by the software, considering the desired maximization.

Thus, it is possible to control the machining of the outer and inner diameters independently, on the basis of the individual critical values of each of the machining tools 12, 13, 14 with independent centralization and also with independent configurations. For instance, the system according to the invention is capable of machining an outer diameter at a range of 11.43 cm to 40.64 cm (4½"-16") with the same precision for the whole range. For this range of outer diameter, the system is capable of machining an average of 80 pipes per 8-hour work shift.

Figure 5:
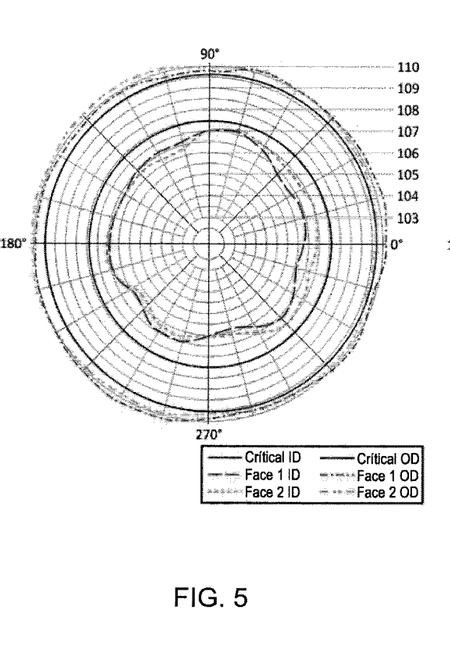
FIG. 5 is a graph showing the measurements of the inner and outer diameters of a pipe prior to processing.
Figure 6:
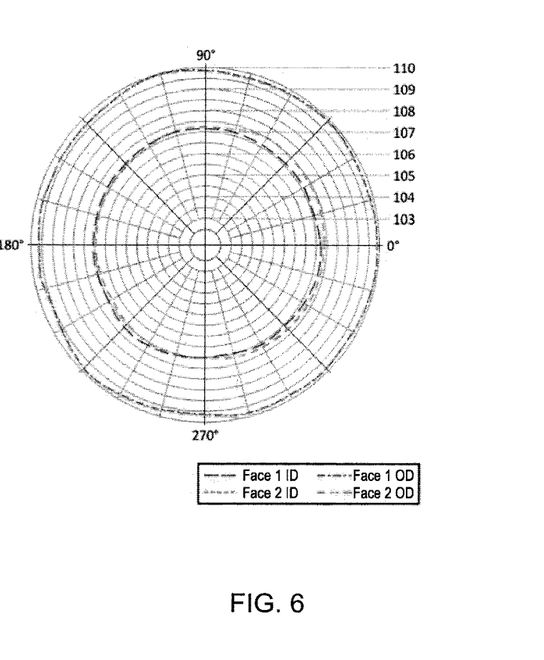
FIG. 6 is a graph showing the measurements of the inner and outer diameters of the pipe after processing.

The graphs of FIGS. 5 and 6 enable a better understanding of the functioning of the invention, since they show the measurements of the inner and outer diameters taken of the pipe, representing the cross-section thereof, respectively before and after machining. As can be seen in FIG. 5, usually the wall thickness of the pipes prior to machining is larger than the target critical value. In this figure, the critical/target values of the inner and outer diameters are marked in full lines, while the measured values are represented in dashed lines. The values were measured along two pipe lengths represented by ID Face 1 ID Face 2, OD Face 1, OD Face 2. There is a difference in both the outer diameter and the inner diameter with respect to the critical values. Therefore, the system according to the invention needs to determine which parts of the pipe surface will be machined in combination on the inner and on the outer walls, to achieve the desired wall thickness throughout the circumference of the pipe end and, at the same time, reduce as much as possible the eccentricity between the inner and outer diameters.

It is further noted in FIG. 5 that, due to the differences in the inner and outer diameters of the pipe wall with respect to the critical values, and to the irregularities and undulations on the surface of these walls, it is necessary to adjust the positioning of the circumferences corresponding to the critical values of the inner and outer diameters on the pipe, so as to guarantee the desired wall thickness through the pipe circumference after machining.

The result of the machining is shown in FIG. 6, where one can see that the undulations on the inner surface were considerably reduced, and the inner diameter was increased to a dimension close to the critical value represented in the continuous line of FIG. 5. The dimension of the outer diameter was also brought close to the critical value, and the undulations on the outer surface were reduced, at the same time the real circumferences of the inner and outer diameters became more concentric.

The system according to the invention can also be used only to measure the dimensions of the diameters and wall thickness of the pipes, for instance in the cases in which adjustments of pipe dimension are not necessary.

The invention also relates to an automatic method for measuring and machining ends of tubular elements, by means of which one initially measures the inner diameter and the outer diameter of the pipe end on at least one pipe length. The measurements of these two diameters are carried out independently of each other. One may carry out measurements at the 360 degrees of the pipe circumference, for example at intervals of one degree between each measurement, or at larger or smaller intervals, if desired or necessary. This interval may be programmed and adjusted. Usually, one makes up to three measurements at different lengths of the pipe end, and preferably at a position up to about 300 mm from the pipe end.

After the measurements have been made, the measured values of outer and inner diameters are processed and compared with critical values of outer and inner diameters determine before depending on the design and the desired application, or previously calculated by the electronic central 6 after scanning pipe samples from that lot. The minimum, maximum and middle values of the outer and inner diameters, as well as the calculation of the wall thickness as final product of this scanning of the sensors around the perimeter at the pipe ends. The middle values of these diameters are calculated and recorded. One also identifies the eccentricity between these two diameters and the wall thickness throughout the periphery of the pipe end, as can be seen in the representations shown in FIG. 5 of the measured values of a pipe. The determination of the wall thickness of the pipe is made by the difference between the measured values of outer and inner diameters at each position of the pipe circumference on the measured length.

The identified values of diameters and wall thickness are compared with the respective critical values determined previously, in order to identify subsequently which parts of the pipe surface need to be machined and to which extend the machining needs to be made, so that the final real values of the outer and inner diameters and of the wall thickness of the pipe will come close to the critical values of outer and inner diameters. This determination of the parts to be machined also seeks to achieve maximization of the wall thickness and reduction of eccentricity of the pipe, in order to achieve the best tolerance values of the pipe end. In this step, one identifies the best combinations of inner and outer diameters of the pipe, considering the real measured values of these parameters, so that it will be sized within the critical values of these variables. The dedicated software of the control central calculates the machining coordinates, so that the restricted tolerance values can be achieved at the ends after machining. The software indicates the position on the tube and the amount of material to be machined.

By means of the results from calculations obtained by this dedicated software, one determines whether the ends will or will not be machined, that is, whether the nominal measurements of the pipes may or may or are sufficient to leave the pipe ends with the measurements as specified. The machining will take place only if the end has sufficient material to achieve the final target shape. Otherwise, the pipe is rejected.

If the dimensions of the pipe ends are sufficient to be machined, the coordinates of the machining position are sent to the control CNC of the machining tools and the machining process is released by the software. The machining of the inner and outer diameters of the pipe end is carried out in a controlled manner, as a function of the results of the above-mentioned calculations the processing step. The computer-aided numeric control (CNC) is used to control the machining in a precise way, and so that the processes of machining the inner and outer diameters can be made independently from each other.

Figure 3:
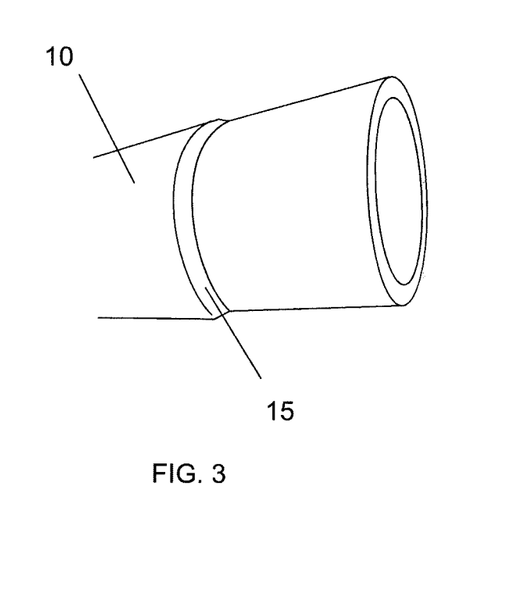
FIG. 3 is a perspective view of the end of a pipe after it has been processed.
Figure 4:
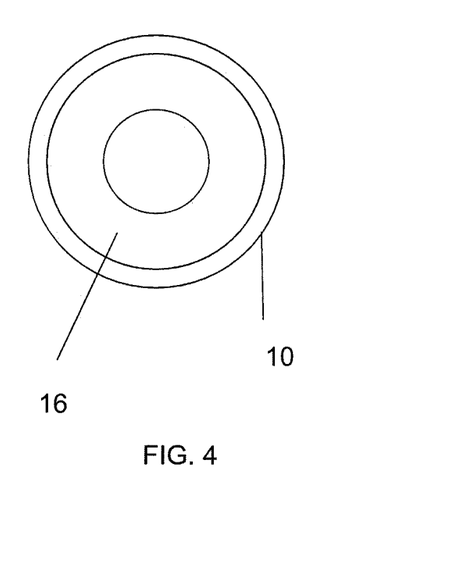
FIG. 4 is a front view of the pipe of FIG. 3, showing the inner diameter of the pipe end after processing.

The machining may be controlled and adjusted for pipes of different sizes and natures, with equally different parameters of wall thickness and end tolerance. Besides, in order to improve fatigue strength of the pipe, a transition region 15, 16 may be machined on the pipe, which is called transition tapering and is smooth and without sharp points between pipe end and pipe body, on both inner and outer surface, as shown in FIGS. 3 and 4. In the transition region 15 on the outer surface, the outer diameter is machined with dimensions that increase progressively toward the body center in axial direction of the pipe, while in the transition region 16 on the inner surface, the inner diameter is machined with dimensions that decrease progressively toward the pipe center, forming a transition region with larger wall thickness between the pipe end and the rest of its body. In an embodiment of the invention, the length of the pipe end that is machined is of about 300 mm, including the transition region. This length may be longer than 300 mm, if necessary.

Finally, after the controlled machining, one carries out a new step of measuring the inner and the outer diameters of the pipe end at the same positions along the pipe length where the measurements were made before machining, so as to verify whether the final measurements are within the target values foreseen by the software. The values measured after machining are recorded. In this way, one can generate a record of final values of the dimensions of the machined pipes of the same lot, for instance.

In a preferred embodiment of the invention, all the steps of the method described herein may be carried out by the system according to the invention described herein. This system and this method have been developed and conceived so as to be used on both the pipe production line, for instance, in the finish stage, and out of the production line, without interfering with the flow of production of pipes. Besides, the system and the method described herein impart flexibility to the production line in terms of measurement of the pipe ends, as well as to the combination of the measurement with the machining of these pipes.

Both before and during the execution of the method according to the invention and/or the use of the system according to the invention, it is important to carry out procedures of calibrating the pieces of equipment employed, which may be repeated as many times as necessary to the adequate functioning of the method and of the system. The calibration may be made on test pipe-lengths with known dimensions.

In FIGS. 3 and 4, which show the pipe end after it has been machined and sized by the system and by the method of the invention, it is possible to see that the finished inner and outer surfaces exhibit roughness with maximum values of 125 RMS (N8, Ra=3.2 µM). Transition roughness in the form of a ramp 12 (known also as "transition taper") with minimum ratio of 7:1 in the region of inner diameter was used, according to specifications of the design. A transition region in the form of a smoother ramp, with ratio of 15:1 was applied in the transition region 12 of the outer diameter, in order to prevent problems during application of the outer coating. Regions of gentle transition on the inner and outer diameters also contribute to improve the fatigue strength. The transition region in the form of a ramp may be sized by the equipment so as to meet any technical norm specification of specifications of the client.

The system and the method according to the invention are capable of producing tubular lines to be used in riser designs in petroleum exploitation in Brazil (Sapinhoá, Guará-Lula and P-55) with quite restricted pipe-end for the outer diameter (±0.75 mm) and for the inner diameter (±0.25 mm), or still more restricted for the inner diameter, on the order of ±0.20 mm, for example, used for the design LLOG for the Gulf of Mexico. In the outer diameter, the tolerance of the system may also reach +/−0.20 mm. For these designs, one supplied successfully about 13,500 pipes, and which were soldered and launched by the J-lay or Reel-Lay method. The results of fatigue on soldered joints were good and were in conformity with the strict specifications applicable to these designs. Effective dimensional control of tolerances at the ends of all the pipes prevent the need for any type of classification and selection of pipes for the operations of soldering pipes for the production of oil or gas, be this on offshore bases (spoolbases) or on launching vessels, and ensures good matching of all the pipe connections during any type of soldering process.

The reasons for this strict control for the differences between the maximum and minimum values of the inner and outer diameters are linked to the severe specifications applicable to soldered joints, in order to ensure good fatigue strength, which is particularly critical for applications of risers. The system and the method of the present invention guarantee differences between maximum and minimum limits on the order of ±0.20 mm for the inner diameter.

In FIGS. 5 to 12, one presents results that demonstrate the excellent performance of the automatic system and method of measuring and machining ends of tubular elements described herein in terms of efficacy, to achieve the geometry of the outer diameter, of the inner diameter, and of the wall thickness. The pipes on which the tests were carried out, which refer to the figures, were supplied for the riser design. The measurements were made before and after the machining operation for comparison and for showing the capability of the equipment to improve the dimensions of the pip ends.

The results shown in these figures refer to pipes that aim at achieving the following real dimensions: wall thickness: 25.4 mm−8%+10%, target outer diameter: 203±0.75 mm/target inner diameter: 154.15±0.25 mm.

For each pipe end, an analysis of all the measurements of all the lengths is made automatically by the software used in the system and method of the present invention. Again with regard to the example of FIG. 5, in the graph one demonstrates, in dotted lines, measurements made on two lengths of the pipe end, at 50 millimeter and 150 mm from the edge before the machining operation, which are represented by ID Face 1, ID Face 2, OD Face 1, OD Face 2. It is important to observe that the inner diameter on the two measurement sections varies significantly throughout the 360 degrees analyzed, whereas the outer diameter varies less due to the final calibration passes at the end of the lamination process. The continuous lines correspond to the critical inner and outer diameters of reference calculated by the software in conformity with the application requirements demanded in the design.

As can be seen in FIG. 6, which represents the measurements made after the machining process, it is possible to observe a significant improvement in the ovality of the inner diameter. This demonstrates the efficacy of the system and of the method according to the invention to improve the geometry and the tolerances regarding the inner and outer diameters, wall thickness and eccentricity of the pipe end, on the basis of the previous measurements and of the adequate calculations of the critical values aimed at. Thus, it is possible to achieve optimized matching for all the pipes produced, preventing losses of productivity during the soldering operations and providing an improvement in the performance of the products during their application.

Figure 7:
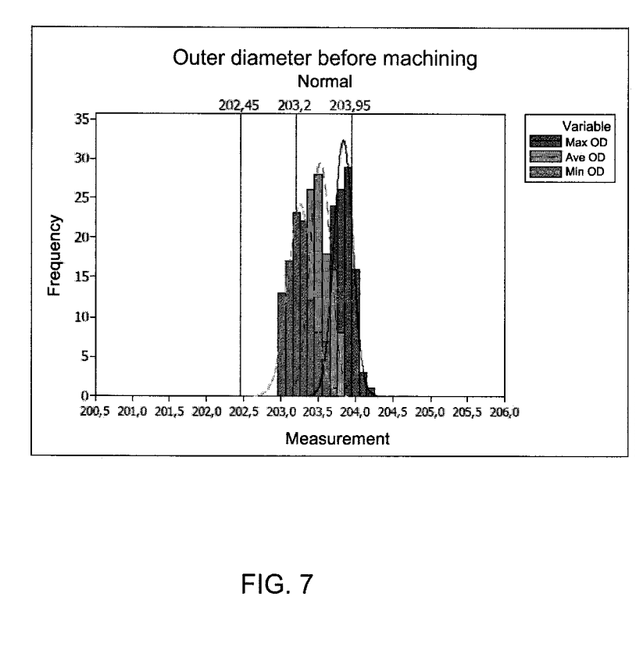
FIG. 7 is a graph showing the normal distribution of the minimum, middle and maximum values of the outer diameter of the pipe prior to processing.
Figure 8:
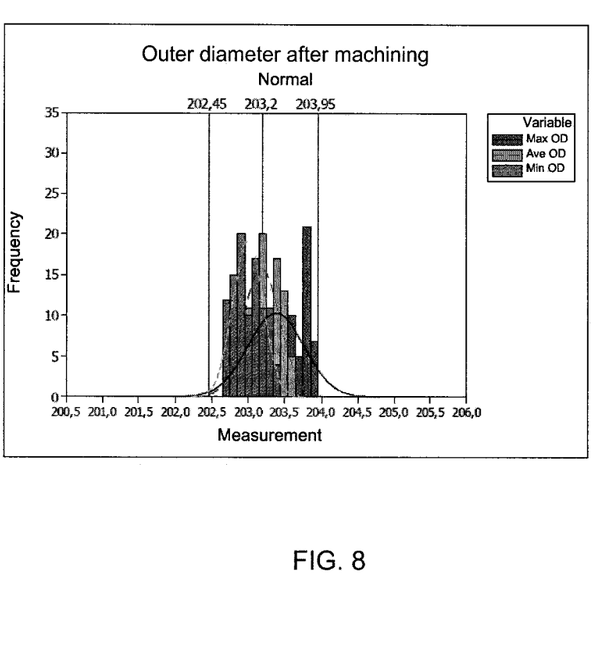
FIG. 8 is a graph showing the normal distribution of the minimum middle and maximum values of the outer diameter of the pipe aster processing.

The graphs of FIGS. 7 and 8 show the normal distribution of the minimum (OD min), middle (OD Ave) and maximum (OD Max) of the outer diameter (OD) of the pipe before and after machining, respectively. The abscissas axis indicates the value of the outer diameter measured in millimeters and the ordinates axis indicates the frequency at which each measurement of outer diameter has been obtained. The vertical lines represent the desired target value of the outer diameter and the respective maximum and minimum tolerances (203±0.75 mm). The comparison between these figures shows that one obtained significant alterations in the dimensions of the outer diameter after machining by using the parameters defined by the system and by the method according to the invention, to achieve maximization of the wall thickness and eccentricity of the pipe ends. The curves of normal distribution of the minimum, middle and maximum values of the outer diameter move totally into the range of target values of outer diameter, including the tolerances (203±0.75 mm), and the meddle values of these curves come closer to the central target value of 203 mm.

Figure 9:
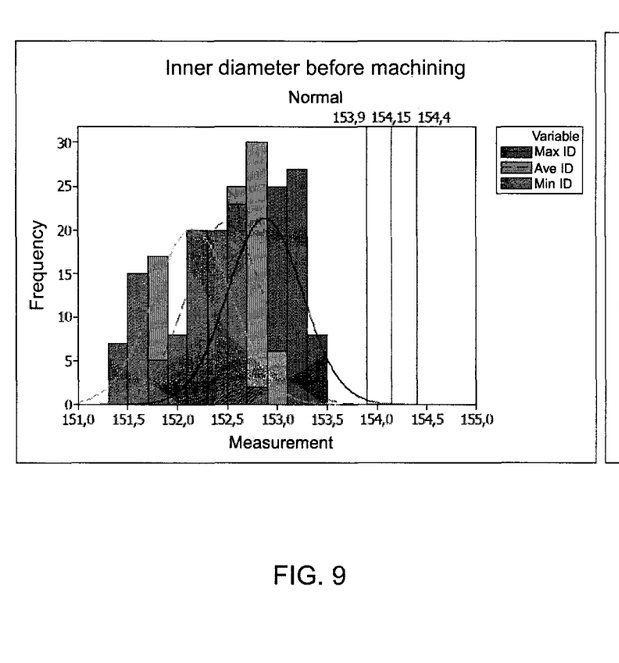
FIG. 9 is a graph showing the normal distribution of the minimum, middle and maximum values of the inner diameter of the pipe prior to processing.
Figure 10:
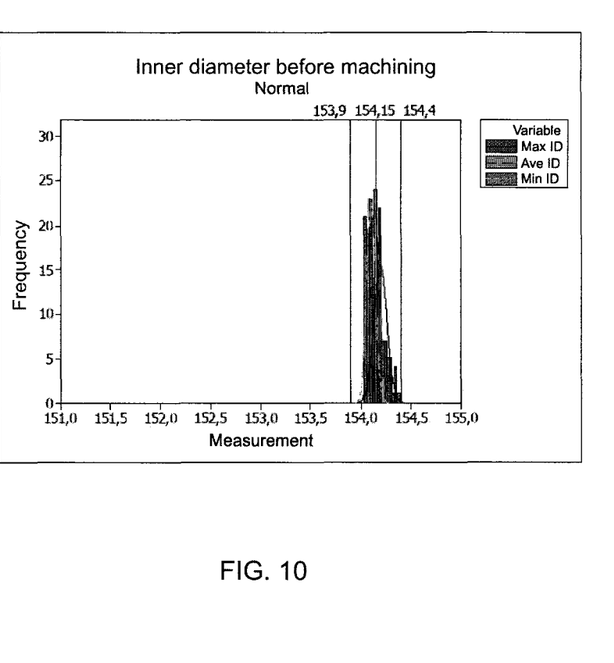
FIG. 10 is a graph showing the normal distribution of the minimum, middle and maximum values of the internal diameter of the pipe after processing.

The graphs of FIGS. 9 and 10 show the normal distribution of the minimum (ID min), middle (ID Ave) and maximum (ID Max) values of the outer diameter (ID) of the pipe before and after machining, respectively. The abscissas axis indicates the value of the middle inner diameter in millimeters and the ordinates axis indicates the frequency at which each measurement of inner diameter has been obtained. The vertical lines represent the desired target value of the inner diameter and the respective maximum and minimum tolerances (154.15±0.25 mm). The analysis of these two figures shows that before the machining operation all the middle values of internal diameter were out and quite away from the range of target values of internal diameter, including the tolerance (154.15±0.25 mm) as can be seen in FIG. 9. After machining, the curves of normal distribution of the minimum, middle and maximum values of the inner diameter move totally into the range of target values, and the middle values of these curves come quite close to the central target value of 154.15 mm.

Figure 11:
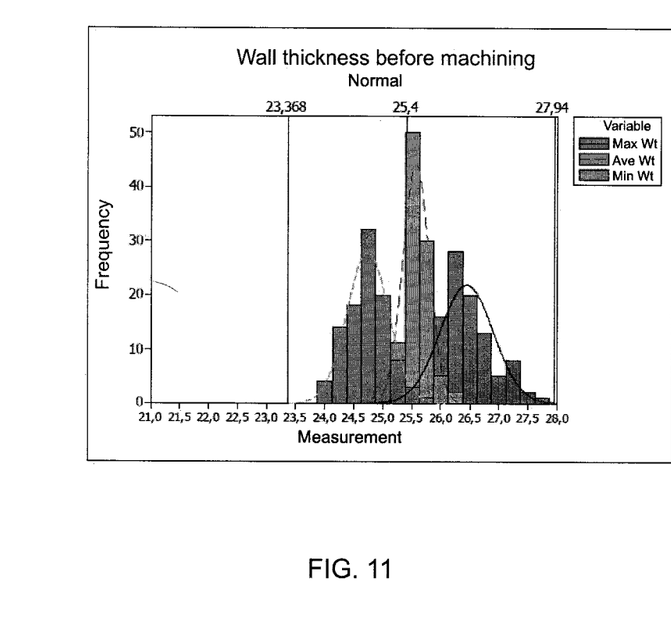
FIG. 11 is a graph showing the normal distribution of the minimum, middle and maximum values of the wall thickness of the pipe prior to processing.
Figure 12:
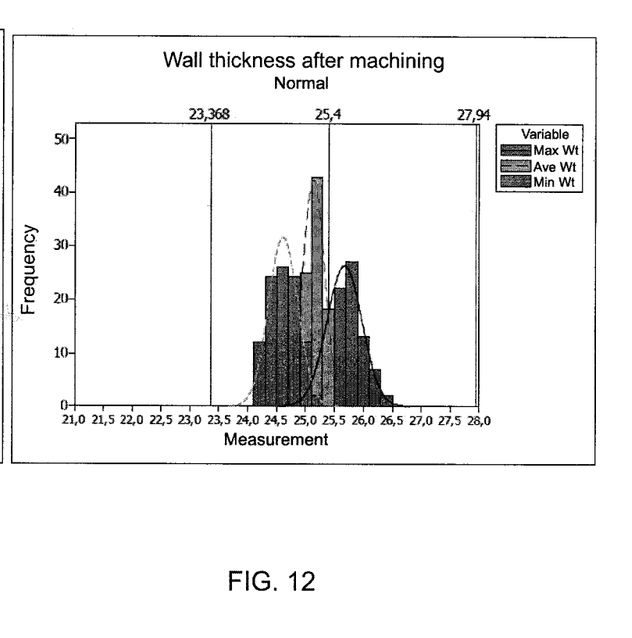
FIG. 12 is a graph showing the normal distribution of the minimum, middle and maximum values of the wall thickness of the pipe after processing.

Hence it follows that the inner and outer surfaces of the pipe end were machined until the inner diameter reached a value close to the minimum tolerance limit and until the outer diameter reached a value close to the maximum tolerance limit. FIGS. 11 and 12 show the normal distribution of the minimum (Wt min), middle (Wt Ave) and maximum (Wt Max) values of the wall thickness (Wt) for this pipe end before and after machining, respectively. It should be noted that, after machining, the minimum, middle and maximum values also come quite close to the desired middle wall thickness and its respective tolerances (25.4 mm−8%+10%) represented by the vertical lines. Moreover, one determined measurements of maximum wall thickness with values higher than 26.5 mm, which shows the maximization of the wall thickness achieved.

Thus, one can observe that the system and the method according to the invention have achieved the desired objective of minimizing the differences between the maximum and minimum values of diameter and of obtaining the maximized specified tolerances of wall thickness.

The results achieved with the automatic system and method of measuring and machining ends of tubular elements enable one to conclude that they have high capacity for calculating the adequate machining parameters, in order to maximize the minimum and middle wall thickness and reduce eccentricity. The system and the method according to the invention are also quite effective to correct the ovality/circularization of the outer diameter and of the inner diameter. The differences between the maximum and minimum values of diameter can be significantly improved by the system and by the method of the invention, after controlled machining.

Besides, the system and the method according to the invention enable high repetition and reproduction capacity for the complete lots of pipes, which prevents the need for triage and additional selection on the onshore bases and on the pipe-layers. Thanks to the greater productivity as compared with the manual methods of sizing ends, the system and the method according to the invention can be used for oil and gas transport lines as well.

A preferred example of embodiment having been described, one should understand that the scope of the present invention encompasses other possible variations, being limited only by the contents of the accompanying claims, which include the possible equivalents.

What is claimed is:

1. An automatic system for measuring and machining ends of tubular elements, comprising:
   measuring equipment that has:
   an internal laser sensor to measure the inner diameter of the pipe end on at least one section of the pipe length;
   an external laser sensor to measure the outer diameter of the pipe end on at least one section of the pipe length;
   a machining station that has:
   at least one machining tool for machining the inner diameter of the pipe and at least one machining tool for machining the outer diameter of the pipe, the machining tools being operated independently of each other;
   an electronic interface central between the measuring equipment and the machining tools, which contains records of critical values of outer and inner diameters for the pipe end,
   the electronic interface central receives the measured values of outer and inner diameters from the measuring equipment, compares them with the critical values of outer and inner diameters, and controls the operation of the machining tools for machining the inner and outer diameters as a function of the result of the comparison, so that the real values of the outer and inner diameters of the pipe will come close to the critical values of the outer and inner diameters.

2. The system according to claim 1, characterized in that the measuring equipment further has a positioning laser sensor to measure the positioning of the machining tools.

3. The system according to claim 1, characterized in that the measuring equipment comprises an automated arm that has, at one end, a fork with a plurality of teeth, each laser sensor being arranged on one tooth of the fork.

4. The system according to claim 1, characterized in that the machining station has at least one machining tool for machining the inner diameter of the pipe and two machining tools for machining the outer diameter of the pipe, each tool being operated independently.

5. The system according to claim 1, characterized in that the electronic interface central has a computer-aided numeric control that controls the operation of the machining station.

6. The system according to claim 1, characterized in that the electronic interface central stores values of outer and inner diameter of the pipe, measured before and after the machining.

7. The system according to claim 1, characterized in that the electronic interface central controls the machining operation of the machining tools to reduce pipe eccentricity.

8. The system according to claim 1, characterized in that the electronic interface central has a measurement analysis unit that calculates the wall thickness of the pipe by the difference between the measured values of outer and inner diameter at each position of the pipe circumference, and compares the calculated values of wall thickness with the critical values of wall thickness.

9. The system according to claim 1, characterized in that the electronic interface central determines the minimum and maximum values of outer diameter and inner diameter, of the eccentricity and of the wall thickness of the pipe end on the basis of the measured values of outer and inner diameters of the pipe.

10. The system according to claim 1, characterized in that the electronic interface central calculates the critical values of out and inner diameters for the pipe end starting from a previous measurement of samples of tubular elements and a statistic analysis of the variability of the maximum and minimum measured values of the samples.

11. An automatic method for measuring and machining ends of tubular elements, characterized by comprising:
    measuring the inner diameter of the pipe end on at least one section of the pipe length;
    measuring the outer diameter of the pipe end on at least one section of the pipe length;
    processing the measured values of outer and inner diameters and comparing them with critical values of outer and inner diameters, and machining, in a controlled manner, the inner diameter and the outer diameter of the pipe end as a function of the result of the comparison, so that the real values of the outer and inner diameters of the pipe will come close to the critical values of outer and inner diameters.

12. A method according to claim 11, characterized by comprising, after the machining step, a new step of measuring the inner diameter and the outer diameter of the pipe end on at least one section of the pipe length, and a step of recording the final measured values of the inner diameter and of the outer diameter of the pipe end after the machining.

13. The method according to claim 11, characterized in that the steps of measuring the inner diameter and the outer diameter of the pipe end are carried out independently of each other.

14. The method according to claim 11, characterized in that the control of the step of machining the inner diameter and the outer diameter of the pipe is carried out by means of a computer-aided numeric control.

15. The method according to claim 11, characterized in that the controlled machining of the inner diameter and of the outer diameter of the pipe end comprises:
    machining the inner diameter with dimensions that decrease progressively toward the pipe center on a segment of the pipe length, and machining the outer diameter with dimensions that increase progressively toward the pipe center on the segment of the pipe length, forming a transition region with larger wall thickness between the pipe end and the rest of the pipe length.

16. The method according to claim 11, characterized in that the controlled machining of the inner diameter and of the outer diameter of the pipe end comprises machining, in a controlled way, the inner diameter and the outer diameter of the pipe end to reduce pipe eccentricity.

17. The method according to claim 11, characterized in that the step of processing the measured values of outer diameter and inner diameter comprises determining the minimum and maximum values of the outer diameter and of the inner diameter, of the eccentricity and of the wall thickness of the pipe end on the basis of the measured values of outer diameter and inner diameter of the pipe.

18. The method according to claim 17, characterized in that the step of determining the wall thickness of the pipe comprises calculating the difference between the measured values of outer diameter and inner diameter at each position of the pipe circumference on the measured section, comparing the calculated values of wall thickness with critical values of wall thickness and identifying the coordinates of the machining positions on the inner diameter and on the outer diameter of the pipe.

19. The method according to claim 11, characterized in that the steps of measuring the inner diameter and the outer diameter of the pipe end are carried out on the sections of the pipe length.

20. The method according to claim 11, characterized by comprising an initial step of calculating the critical values of outer diameter and inner diameter for the pipe end, starting from a previous measurement of samples of tubular elements and a statistical analysis of the variability of the measured maximum and minimum values of the samples.

21. The method according to claim 11, characterized by comprising, prior to the machining step, a step of discarding the pipe, if the measured values of inner diameter and outer diameter are insufficient to achieve the critical values of inner and outer diameters after machining.

* * * * *